United States Patent
Tai et al.

(10) Patent No.: US 9,185,376 B2
(45) Date of Patent: Nov. 10, 2015

(54) APPARATUS AND METHOD OF REDUCING NOISE OF IMAGE

(71) Applicant: SAMSUNG ELECTRONICS CO., LTD., Suwon (KR)

(72) Inventors: Yong Min Tai, Gunpo (KR); Young Su Moon, Seoul (KR); Shi Hwa Lee, Seoul (KR); Jung Uk Cho, Hwaseong (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 77 days.

(21) Appl. No.: 13/888,826

(22) Filed: May 7, 2013

(65) Prior Publication Data

US 2014/0002697 A1    Jan. 2, 2014

(30) Foreign Application Priority Data

Jun. 29, 2012 (KR) .................. 10-2012-0070795

(51) Int. Cl.
| | |
|---|---|
| H04N 3/14 | (2006.01) |
| H04N 5/217 | (2011.01) |
| H04N 9/68 | (2006.01) |
| G06T 5/00 | (2006.01) |
| H04N 9/04 | (2006.01) |
| H04N 5/357 | (2011.01) |
| H04N 5/232 | (2006.01) |

(52) U.S. Cl.
CPC *H04N 9/68* (2013.01); *G06T 5/002* (2013.01); *H04N 5/2173* (2013.01); *H04N 5/23229* (2013.01); *H04N 5/357* (2013.01); *H04N 9/045* (2013.01); *G06T 2207/10024* (2013.01); *G06T 2207/20016* (2013.01)

(58) Field of Classification Search
CPC .............................. H04N 5/213; H04N 5/217
USPC ................................................. 348/241–257
See application file for complete search history.

(56) References Cited

U.S. PATENT DOCUMENTS

| | | | |
|---|---|---|---|
| 6,526,181 B1 | 2/2003 | Smith et al. | |
| 8,559,745 B2 * | 10/2013 | Peng et al. | ..................... 382/263 |
| 2008/0170796 A1 * | 7/2008 | Hwang et al. | ................. 382/266 |
| 2008/0218782 A1 | 9/2008 | Seki et al. | |
| 2009/0160992 A1 * | 6/2009 | Inaba et al. | ................... 348/308 |
| 2011/0194763 A1 * | 8/2011 | Moon et al. | ................... 382/167 |
| 2011/0211098 A1 | 9/2011 | Bosco et al. | |

FOREIGN PATENT DOCUMENTS

| | | |
|---|---|---|
| KR | 2003-0073373 | 9/2003 |
| KR | 10-0647402 | 10/2006 |
| KR | 10-2010-0077314 | 7/2010 |
| KR | 10-2011-0029001 | 3/2011 |
| KR | 10-2011-0079315 | 7/2011 |
| KR | 10-2011-0138969 | 12/2011 |

* cited by examiner

*Primary Examiner* — Tuan Ho
*Assistant Examiner* — Selam Gebriel
(74) *Attorney, Agent, or Firm* — Staas & Halsey LLP (57) ABSTRACT

Provided is an apparatus and method for reducing noise in an image, the apparatus including a reference image creator unit to create a reference image based on chrominance about a plurality of channels included in an output image obtained from an image sensor of a camera, and a noise reduction unit to perform noise reduction for the respective channels using the created reference image. The plurality of channels may include at least one of a green channel, a red channel, and a blue channel.

15 Claims, 7 Drawing Sheets

FIG. 1

<Noise reduction apparatus 100>

APPARATUS AND METHOD OF REDUCING NOISE OF IMAGE

CROSS-REFERENCE TO RELATED APPLICATIONS

This application claims the priority benefit of Korean Patent Application No. 10-2012-0070795, filed on Jun. 29, 2012, in the Korean Intellectual Property Office, the disclosure of which is incorporated herein by reference.

BACKGROUND

1. Field

One or more embodiments relate to an apparatus and method for reducing noise in an image, and more particularly, to technology for reducing noise in an image by an image signal processor configured to create a color image using a single color filter array Bayer pattern image that is output from an image sensor of a camera.

2. Description of the Related Art

To capture a shake-free image in a low illumination environment, a shutter speed may need to be decreased, and sensitivity or an International organization for standardization (ISO) speed may need to be increased. Accordingly, a Bayer pattern image in which noise is amplified may be created.

In a widely used digital image input device, such as a digital camera and a smart phone, for example, an image signal processor may create a color image using a color filter array Bayer pattern obtained from a charged coupled device (CCD) or a complementary metal-oxide semiconductor (CMOS) sensor. A noise reduction module may perform a functionally important role in an image signal processing chain.

In the case of failing to effectively remove or reduce noise present in a Bayer image, the noise may result in an adverse affect, such as a degradation of the quality of an image in a color filter array interpolation module configured to create a red, green, blue (RGB) image, for example.

Accordingly, noise reduction technology of a Bayer pattern image may be important for an image input apparatus to create the high quality image.

In particular, according to an increase in sensitivity or an ISO speed of a captured image, additive white Gaussian noise (AWGN) and impulse noise may be amplified. Accordingly, there is a need to effectively reduce noise.

SUMMARY

The foregoing and/or other aspects are achieved by providing a noise reduction apparatus of an image signal processor, the apparatus including a reference image creator unit to create a reference image based on chrominance about a plurality of channels included in an output image obtained from an image sensor of a camera, and a noise reduction unit to perform noise reduction for the respective channels using the created reference image. The plurality of channels may include at least one of a green channel, a red channel, and a blue channel.

The reference image creator unit may perform noise reduction with respect to the green channel, and may create the reference image using the noise reduced green channel, the red channel, and the blue channel.

The reference image creator unit may perform multi-resolution noise reduction by performing bilateral filtering for the respective pyramid levels of the green channel using a Laplacian pyramid, and may create the reference image using the noise reduced green channel.

The reference image creator unit may generate a pixel value of a red pixel position corresponding to the red channel by applying chrominance of the red pixel position corresponding to the red channel and by interpolating the green channel and the blue channel, and may create the reference image using the generated pixel value of the red pixel position.

The reference image creator unit may generate a pixel value of a blue pixel position corresponding to the blue channel by applying chrominance of the blue pixel position corresponding to the blue channel and by interpolating the green channel and the red channel, and may create the reference image using the generated pixel value of the blue pixel position.

In the case of performing bilateral filtering with respect to at least one of the red channel and the blue channel included in the output image, when a difference value between a center pixel and an in-window pixel is greater than a first threshold, and when a difference value between a pixel corresponding to the center pixel and a pixel corresponding to the in-window pixel in the reference image is less than a second threshold, the noise reduction unit may perform noise reduction with respect to at least one of the red channel and the blue channel.

The noise reduction unit may distinguish the green channel, the red channel, and the blue channel, and may perform noise reduction individually with respect to the green channel, the red channel, and the blue channel.

The noise reduction unit may perform noise reduction for the respective channels by applying the created reference image to the red channel and the blue channel.

The foregoing and/or other aspects are achieved by providing a noise reduction method of an image signal processor, the method including generating a pixel value of a pixel position corresponding to a first channel by applying chrominance about the first channel among a plurality of channels included in an output image obtained from an image sensor of a camera and by interpolating a second channel and a third channel, and creating a reference image using the generated pixel value of the pixel position, and performing noise reduction for the respective channels using the created reference image. The plurality of channels may include at least one of a green channel, a red channel, and a blue channel.

The creating may include performing noise reduction with respect to the green channel, and creating the reference image using the noise reduced green channel, the red channel, and the blue channel.

The creating may include performing multi-resolution noise reduction by performing bilateral filtering for the respective pyramid levels of the green channel using a Laplacian pyramid, and creating the reference image using the noise reduced green channel.

The performing may include performing noise reduction with respect to at least one of the red channel and the blue channel when a difference value between a center pixel and an in-window pixel is greater than a first threshold and when a difference value between a pixel corresponding to the center pixel and a pixel corresponding to the in-window pixel in the reference image is less than a second threshold, in the case of performing bilateral filtering with respect to at least one of the red channel and the blue channel included in the output image.

The performing may include distinguishing the green channel, the red channel, and the blue channel, and performing noise reduction individually with respect to the green channel, the red channel, and the blue channel.

The performing may include performing noise reduction for the respective channels by applying the created reference image to the red channel and the blue channel.

The foregoing and/or other aspects are achieved by providing a noise reduction method of an image signal processor. The method includes creating, by way of a processor, a reference image by generating a pixel value of a pixel position corresponding to a first channel, of a plurality of channels included in an output image obtained from an image sensor of a camera, by applying chrominance of the first channel and by interpolating at least one other channel of the plurality of channels, and performing noise reduction for each of the plurality of channels using the created reference image.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

When it is determined detailed description related to a known function or configuration they may make the purpose of the embodiments unnecessarily ambiguous in describing the embodiments, the detailed description will be omitted here. Also, terminologies used herein are defined to appropriately describe the exemplary embodiments of the embodiments and thus may be changed depending on a user, the intent of an operator, or a custom. Accordingly, the terminologies must be defined based on the following overall description of this specification.

Figure 1:
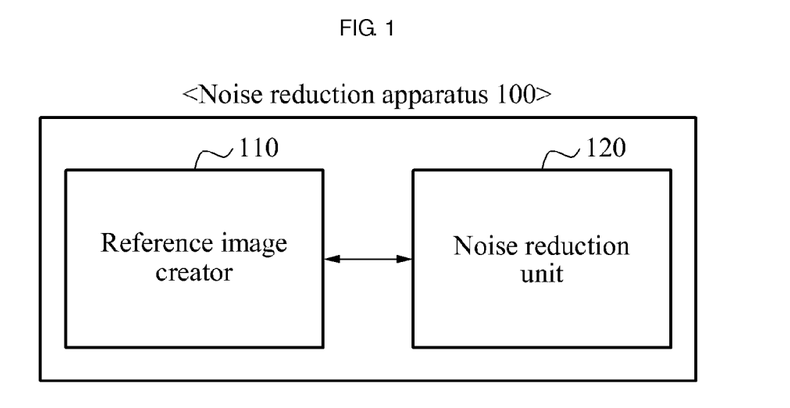
FIG. 1 illustrates a noise reduction apparatus according to an embodiment.

FIG. 1 illustrates a noise reduction apparatus 100 according to an embodiment.

To capture a shake-free image in a low illumination environment, sensitivity or an International organization for standardization (ISO) speed may increase and thus, a Bayer pattern image in which noise has been amplified may be created.

The noise reduction apparatus 100 may create a high quality color image by effectively reducing noise present in the Bayer pattern image.

The noise reduction apparatus 100 may be applied to an image signal processor, such as a digital camera, a digital camcorder, or a smart phone, any of which may be equipped with a digital image input sensor, for example.

To this end, to perform noise reduction based on color noise in a domain of the Bayer pattern image, the noise reduction apparatus 100 may create a reference image based on chrominance and may perform noise reduction for each channel using the created reference image, instead of generating a chrominance channel.

Referring to FIG. 1, the noise reduction apparatus 100 may include, for example, a reference image creator unit 110 and a noise reduction unit 120.

The reference image creator unit 110 may create a reference image based on chrominance about or obtained from a plurality of channels included in an output image obtained from an image sensor of a camera.

Even though a Bayer pattern image is described as the output image that is obtained from the image sensor of the camera, it is only an example. Therefore, the output image obtained from the image sensor of the camera is not limited to the Bayer pattern image but may also include other image types such as from an EXR color filter array, an X-Trans filter CMOS sensor, a Foveon X3 sensor, a CYGM filter (cyan, yellow, green, magenta), an RGBE filter (red, green, blue, emerald), or dichroic mirrors, for example.

The plurality of channels may include at least one of a green channel, a red channel, and a blue channel.

As an example, the reference image creator unit 110 may perform noise reduction with respect to the green channel, and may create the reference image using the noise reduced green channel, the red channel, and the blue channel.

As another example, the reference image creator unit 110 may perform multi-resolution noise reduction by performing bilateral filtering for each pyramid level of the green channel using a Laplacian pyramid, and may create the reference image using the noise reduced green channel.

The reference image may be created in such a manner that the red channel and the blue channel fill in only a portion in which an advantageous point of the green channel is weakened based on a characteristic of the green channel.

The noise reduction unit 120 may perform noise reduction for each channel using the created reference image.

The noise reduction unit 120 may distinguish the green channel, the red channel, and the blue channel, and may perform noise reduction individually with respect to the green channel, the red channel, and the blue channel.

When performing noise reduction for each channel, the noise reduction unit 120 may effectively reduce impulse noise of the red channel and the blue channel using the created reference image. While reducing the impulse noise, details of a high chroma area may be maintained.

To this end, in the case of performing bilateral filtering with respect to the red channel of the output image, the noise reduction unit 120 may verify a difference value between a center pixel and an in-window pixel.

For example, in the case of performing bilateral filtering, the noise reduction unit 120 may determine whether the difference value between the center pixel and the in-window pixel is greater than a first threshold.

When the difference value between the center pixel and the in-window pixel is greater than the first threshold, the noise reduction unit 120 may determine the corresponding pixel as noise.

Accordingly, when the difference value between the center pixel and the in-window pixel is greater than the first threshold, the noise reduction unit 120 may further verify a difference value between a pixel corresponding to the center pixel and a pixel corresponding to the in-window pixel in the reference image.

For example, the noise reduction unit 120 may verify whether the difference value between the pixel corresponding to the center pixel and the pixel corresponding to the in-window pixel in the reference image is less than a second threshold.

When the difference value between the pixel corresponding to the center pixel and the pixel corresponding to the in-window pixel in the reference image is less than the second threshold, the noise reduction unit 120 may determine that significant noise has occurred in the corresponding pixel and may perform noise reduction with respect to the red channel.

On the contrary, when the difference value is greater than the second threshold, the noise reduction unit 120 may either not perform noise reduction by determining the corresponding pixel as an edge, or may perform a low level of noise reduction.

When performing noise reduction for each channel, the noise reduction unit 120 may effectively reduce impulse noise of the red channel and the blue channel using the generated reference image. While reducing the impulse noise, details of a high chroma area may be maintained.

To this end, in the case of performing bilateral filtering with respect to the red channel of the output image, the noise reduction unit 120 may verify a difference value between a center pixel and an in-window pixel.

For example, when performing noise reduction with respect to the red channel or the blue channel, the noise reduction unit 120 may determine whether a corresponding pixel of the red channel or the blue channel is noise based on a difference value between the corresponding pixel and a pixel positioned at the same position in the reference image during a filtering process.

In the case of performing bilateral filtering, the noise reduction unit 120 may determine whether the difference value between the center pixel and the in-window pixel is greater than a first threshold.

When the difference value between the center pixel and the in-window pixel is greater than the first threshold, the noise reduction unit 120 may determine the corresponding pixel as noise.

Accordingly, when the difference value between the center pixel and the in-window pixel is greater than the first threshold, the noise reduction unit 120 may further verify a difference value between a pixel corresponding to the center pixel and a pixel corresponding to the in-window pixel in the reference image.

For example, the noise reduction unit 120 may verify whether the difference value between the pixel corresponding to the center pixel and the pixel corresponding to the in-window pixel in the reference image is less than the second threshold.

When the difference value between the pixel corresponding to the center pixel and the pixel corresponding to the in-window pixel in the reference image is less than the second threshold, the noise reduction unit 120 may determine that significant noise has occurred in the corresponding pixel and may perform noise reduction with respect to the red channel.

On the contrary, when the difference value is greater than the second threshold, the noise reduction unit 120 may either not perform noise reduction by determining the corresponding pixel as an edge, or may perform a low level of noise reduction.

A noise level of the Bayer pattern image may vary based on a channel according to a sensor characteristic. For example, a noise level of the green channel may be relatively lower than a noise level of a red channel and a blue channel. Accordingly, the noise reduction unit 120 may perform noise reduction by distinguishing the green channel from the red channel and the blue channel.

As described above, during a process of creating the reference image, noise reduction with respect to the green channel may be performed prior to performing noise reduction with respect to the red channel and the blue channel.

The noise reduction unit 120 may perform multi-resolution noise reduction for each channel and may perform noise reduction at an interval corresponding to a window size.

By employing the noise reduction unit 120, noise with a relatively great particle size of the red channel and the blue channel, compared to the green channel, may be effectively reduced.

According to an embodiment, when using the noise reduction apparatus 100, an effective noise reduction module of the Bayer pattern image may be proposed. Therefore, differentiated competitiveness may be secured in the quality of an image signal processor embedded with the noise reduction apparatus 100.

Figure 2:
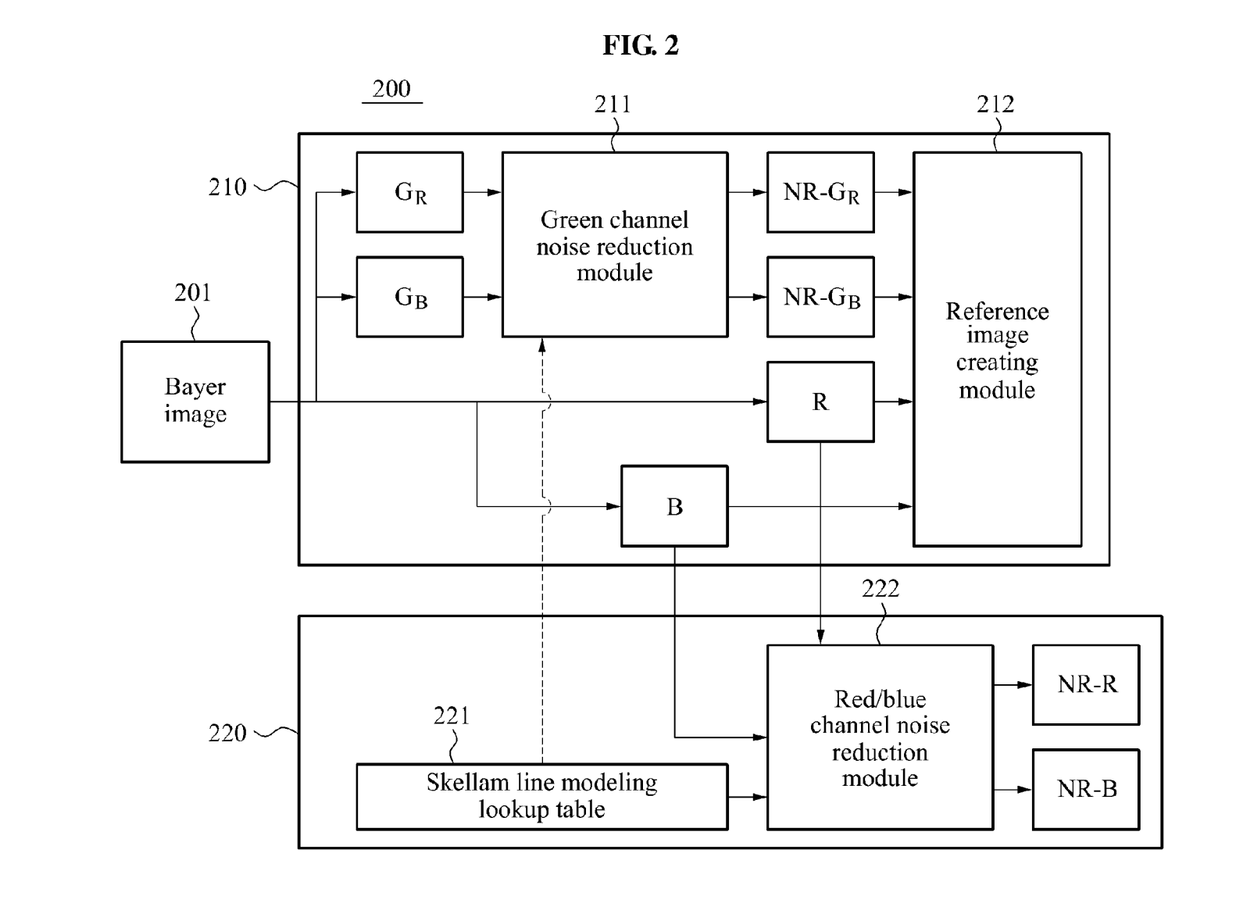
FIG. 2 illustrates a noise reduction apparatus according to another embodiment.

FIG. 2 illustrates a noise reduction apparatus 200 according to another embodiment.

The noise reduction apparatus 200 may create a reference image by performing weighted averaging of a red channel and a blue channel in an area that a green channel may not express, while maximally using details and small noise of the noise reduced green channel.

The noise reduction apparatus 200 may receive, as an output image, a Bayer image 201 that is output from an image sensor, and may perform noise reduction.

The noise reduction apparatus 200 may preferentially perform noise reduction with respect to the green channel in the Bayer image 201.

For example, the noise reduction apparatus 200 may include a reference image creator 210 and a noise reduction unit 220.

The reference image creator 210 may create the reference image based on chrominance about a plurality of channels included in the output image, for example, the Bayer image 201, obtained from the image sensor of a camera.

For the above operation, the reference image creator 210 may include a green channel noise reduction module 211 and a reference image creating module 212.

The green channel noise reduction module 211 may receive a green channel $G_R$ adjacent to the red channel and a green channel $G_B$ adjacent to the blue channel and may perform noise reduction.

The reference image creating module 212 may create the reference image by receiving the noise reduced green channels NR-$G_R$ and NR-$G_B$ and by receiving the red channel and the blue channel for which noise reduction has not performed.

The noise reduction apparatus 200 may create the reference image by performing weighted averaging of the red channel and the blue channel in an area that the green channel may not express, while maximally using details and small noise of the noise reduced green channel.

An image signal processor may employ the noise reduction apparatus 200 in order to create a color filter array Bayer pattern image obtained from the sensor as a high quality RGB image.

In particular, noise reduction processing in a Bayer domain having data prior to color filter array interpolation may maintain a relatively greater linear characteristic compared with data after the color filter array interpolation. Accordingly, noise reduction may be effectively performed.

The noise reduction apparatus 200 may employ the green channel noise reduction module 211.

The noise reduction apparatus 200 may be a module configured to reduce noise in a Bayer pattern image, for example, a Bayer domain. When performing noise reduction for each of four channels, for example, R, $G_R$, $G_B$, and B of the Bayer domain, the noise reduction apparatus 200 may effectively reduce color noise using the reference image created based on chrominance.

When performing noise reduction for each channel without considering chrominance in the Bayer domain, a luminance component and a chrominance component may be mixed for each channel and thus, color noise may not be effectively reduced.

Accordingly, the noise reduction apparatus 200 may receive the Bayer image 201 and may output a noise-reduced Bayer pattern image.

To perform noise reduction for each channel of the Bayer image 201, four channels, for example, R, $G_R$, $G_B$, and B, may be separated, and noise reduction may be preferentially performed with respect to two green channels $G_R$ and $G_B$.

Due to a sensor characteristic of the green channel, compared to the red channel or the blue channel, the green channel may be relatively insensitive to noise, and may have a high luminance component and excellent performance in expressing details.

Accordingly, such characteristic of the green channel may be employed as a good criterion to distinguish noise from details.

Figure 3:
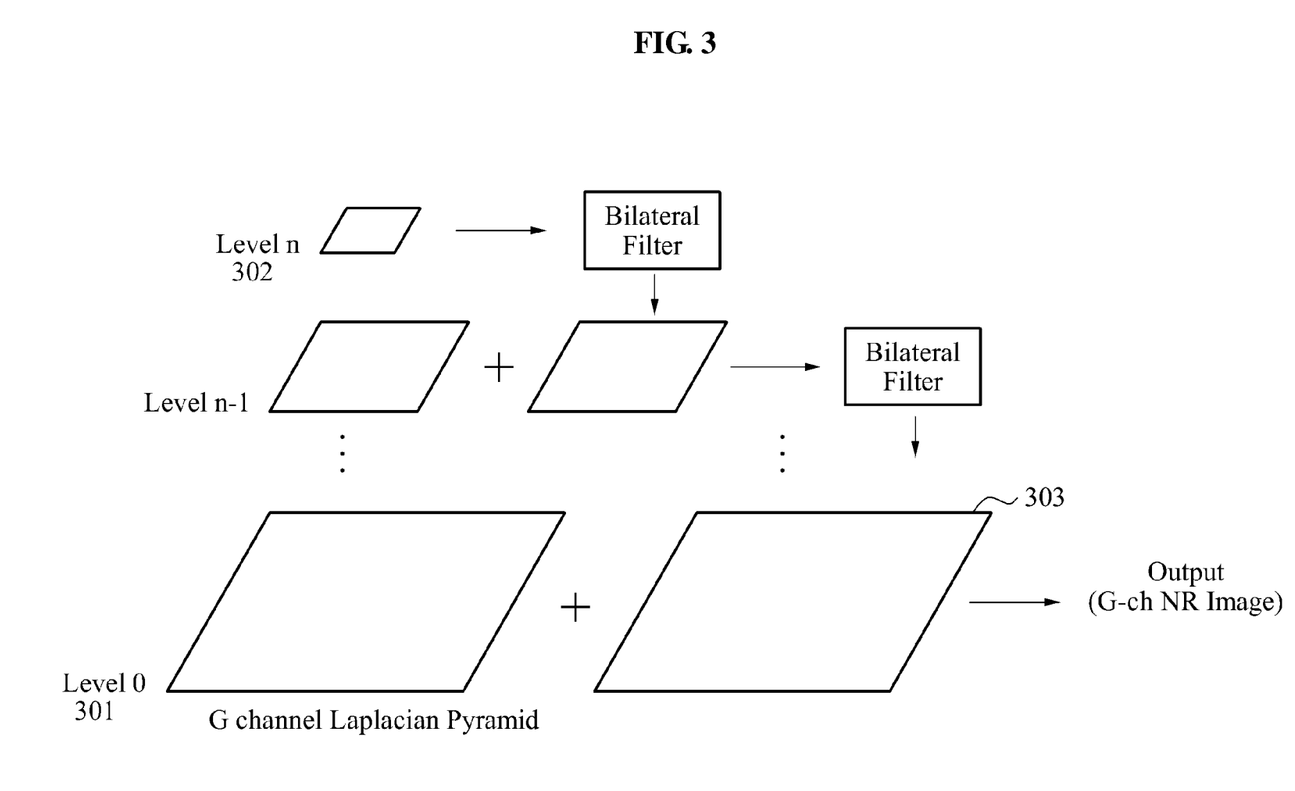
FIG. 3 illustrates an example of performing multi-resolution noise reduction by applying a Laplacian pyramid to a green channel according to an embodiment.

The green channel noise reduction module 211 may use multi-resolution of FIG. 3 in order to reduce color noise with a relatively great particle size generated in a high sensitivity image.

FIG. 3 illustrates an example of performing multi-resolution noise reduction by applying a Laplacian pyramid to a green channel according to an embodiment.

The green channel noise reduction module 211 may perform noise reduction using multi-resolution.

The green channel noise reduction module 211 may create, from a Laplacian pyramid image 301 identified by level 0, a Laplacian pyramid image 302 that is identified by level n, and may perform bilateral filtering with respect to a Laplacian pyramid image of each level.

The green channel noise reduction module 211 may create a pyramid image by employing a filter, for example, a bilateral filter, of maintaining an edge and reducing noise, and may perform noise reduction for each pyramid level, for example, each resolution.

Here, the green channel noise reduction module 211 may create the number of pyramid levels that are predetermined based on ISO, and may change a size of the bilateral filter for noise reduction to a size that is determined based on ISO.

Accordingly, the green channel noise reduction module 211 may add the respective images obtained by performing bilateral filtering and may output an image 303 of the noise reduced green channel.

When performing noise reduction with respect to the green channel, the green channel noise reduction module 211 may perform a low level of noise reduction in order to minimize damage to details.

That the image signal processor performs a low level of noise reduction twice may be more effective in maintaining details than that the image signal processor performs a high level of noise reduction once.

Accordingly, the green channel noise reduction module 211 may not perform a high level of noise reduction in a Bayer domain in which initial noise reduction is to be performed.

Since the green channel is a criterion of details in the reference image, the green channel noise reduction module 211 may not perform noise reduction.

When the green channel noise reduction module 211 employs the bilateral filter as a filter for noise reduction, the green channel noise reduction module 211 may estimate a noise level variable $\sigma_r$ using a Skellam line modeling lookup table 221 so that the noise level variable $\sigma_r$ may vary based on ISO.

The bilateral filter using the noise level variable $\sigma_r$ may be expressed as Equation 1.

$$\hat{I}(p) = \frac{1}{C} \sum_{p' \in N(p)} e^{\frac{-|I(p')-I(p)|^2}{\alpha \sigma_r^2}} e^{\frac{-\|p'-p\|^2}{2\sigma_d^2}} I(p') \quad \text{[Equation 1]}$$

In the bilateral filter expressed as Equation 1, C denotes a normalization factor, p denotes a position of a pixel to be filtered, p' denotes a position of another pixel for noise reduction within the filter, α denotes a factor for adjusting a noise level, for example, intensity variance of a pixel value, $\sigma_r$ denotes a noise level variable, and $\sigma_d$ denotes a distance level variable between pixels.

The reference image creating module 212 may create the reference image using the noise reduced green channels and the red channel and the blue channel that are separate from the Bayer image 201.

The noise level variance $\sigma_r$ increases in an image captured using high sensitivity, for example, high ISO. Accordingly, there may be some constraints in distinguishing details from noise.

In particular, due to a sensor characteristic, compared to the green channel, noise of the red channel and the blue channel may have a relatively great noise level variable $\sigma_r$, and may also have a relatively great noise particle size, for example, a noise area.

Accordingly, in the case of a high sensitivity image, details of the green channel may need to be used for noise reduction of the red channel and the blue channel.

However, in the case of simply determining the green channel as the reference image and performing noise reduction, noise may not be accurately reduced in an area with great chrominance.

For example, details may not be expressed in a green channel domain. However with respect to noise reduction in an area of the red channel or the blue channel in which details are expressed, in the case of creating the reference image by employing only the green channel, all of the details may not be expressed in the created reference image.

Therefore, the noise reduction apparatus 200 may reduce noise of the red channel and the blue channel in an area in which the green channel may not express while maximally using details and small noise of the green channel.

For example, the noise reduction apparatus 200 may perform noise reduction by performing weighted averaging of the red channel and the blue channel using a red/blue channel noise reduction module 222.

The red/blue channel noise reduction module 222 may perform noise reduction with respect to the red channel as follows.

To create a reference image in which luminance at a pixel position of the red channel is considered, the red/blue channel noise reduction module 222 may generate a green value of a red pixel position by interpolating the green channels $G_R$ and $G_B$.

The red/blue channel noise reduction module 222 may create a blue value of a red pixel position by interpolating the blue channel.

The red/blue channel noise reduction module 222 may perform weighted averaging of the green value and the blue value that are generated through interpolation, with respect to an area in which details are not expressed using the green channel, as expressed by Equation 2.

$$I_{Ref\_R} = \begin{cases} I_{G^{NR}_{R\_pos}}, & \left(\left|I_R - I_{G^{NR}_{R\_pos}}\right|\right) < \delta \text{ and} \\ & \left(\left|I_{B\_pos} - I_{G^{NR}_{R\_pos}}\right|\right) < \delta \\ \frac{1}{W_G + W_R + W_B} & \text{otherwise} \\ \left(W_G I_{G^{NR}_{R\_pos}} + W_R I_R + W_B I_{B\_pos}\right), \end{cases}$$ [Equation 2]

In Equation 2, $W_G$ denotes a weight of the green channel, $W_R$ denotes a weight of the red channel, and $W_B$ denotes a weight of the blue channel.

$$I_{G^{NR}_{R\_pos}}$$

denotes a value of the noise reduced green channel that is adjacent to the blue channel, and conditional expression $$\left(\left|I_R - I_{G^{NR}_{R\_pos}}\right|\right) < \delta \text{ and } \left(\left|I_{B\_pos} - I_{G^{NR}_{R\_pos}}\right|\right) < \delta$$

denotes an area in which the reference image may be created using only the green channel. A remaining area may be interpreted as a high chroma area of the red channel or a high chroma area of the blue channel in which details are not expressed using the green channel.

In the case of creating a reference image with respect to a high chroma area, a weight of the green channel may be further used, such as "$W_G > W_B$, $W_G > W_R$", for example, to perform weighted averaging of the red channel and the blue channel based on a predetermined criterion.

A reference image of noise reduction with respect to the blue channel may be provided in the same form as the red channel, which may be expressed by Equation 3.

$$I_{Ref\_B} = \begin{cases} I_{G^{NR}_{B\_pos}}, & \left(\left|I_B - I_{G^{NR}_{B\_pos}}\right|\right) < \delta \text{ and} \\ & \left(\left|I_{R_{B\_pos}} - I_{G^{NR}_{B\_pos}}\right|\right) < \delta \\ \frac{1}{W_G + W_R + W_B} & \text{otherwise} \\ \left(W_G I_{G^{NR}_{B\_pos}} + W_B I_B + W_R I_{R_{B\_pos}}\right), \end{cases}$$ [Equation 3]

In Equation 3, $W_G$ denotes a weight of the green channel, $W_R$ denotes a weight of the red channel, and $W_B$ denotes a weight of the blue channel.

$$I_{G^{NR}_{B\_pos}}$$

denotes a value of the noise reduced green channel that is adjacent to the blue channel, and conditional expression $$\left(\left|I_B - I_{G^{NR}_{B\_pos}}\right|\right) < \delta \text{ and } \left(\left|I_{R_{B\_pos}} - I_{G^{NR}_{B\_pos}}\right|\right) < \delta$$

denotes an area in which the reference image may be created using only the green channel. A remaining area may be interpreted as a high chroma area of the red channel or a high chroma area of the blue channel in which details are not expressed using the green channel.

The red/blue channel noise reduction module 222 may perform noise reduction with respect to the red channel and the blue channel using the created reference image of the red channel or the blue channel.

When performing noise reduction with respect to the red channel and the blue channel, the red/blue channel noise reduction module 222 may perform noise reduction using a multi-resolution scheme, similar to the green channel, and may estimate a noise level variable using a Skellam line model.

To perform noise reduction by distinguishing between noise and details using the reference image, a filter used for noise reduction may vary.

When an existing bilateral filter is employed as a filter for noise reduction of the green channel, a filter in which a method of calculating a difference, for example, an intensity difference between pixel values of the bilateral filter is changed may be employed for noise reduction of the red channel or the blue channel.

Figure 4A:
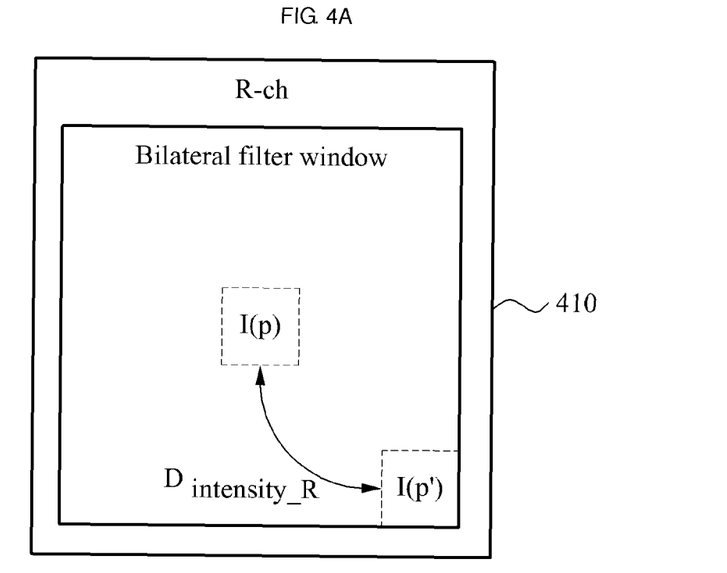
FIGS. 4A and 4B illustrate an example of applying a bilateral filter to a red channel using an intensity difference of a reference image according to an embodiment.
Figure 4B:
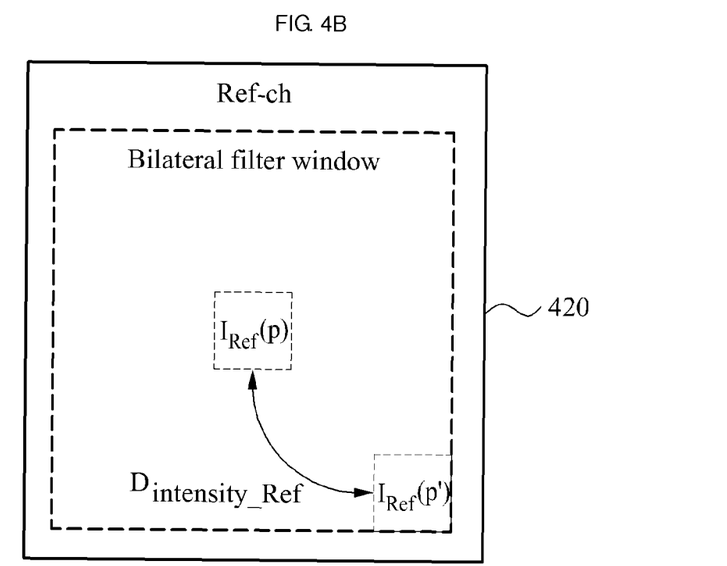

FIGS. 4A and 4B illustrate an example of applying a bilateral filter to a red channel 410 (illustrated in FIG. 4A) using an intensity difference of a reference image 420 (illustrated in FIG. 4B) according to an embodiment.

A difference, for example, an intensity difference between pixel values of the bilateral filter in the red channel 410 may be calculated using a varied filter, as expressed by Equation 4.

$$\hat{I}(p) = \frac{1}{C} \sum_{p' \in N(p)} e^{\frac{-|\hat{D}_{intensity}(p')|^2}{a\sigma_r^2}} e^{\frac{-\|p'-p\|^2}{2\sigma_d^2}} I(p')$$ [Equation 4]

In the bilateral filter expressed by Equation 4, C denotes a normalization factor, p denotes a position of a pixel to be filtered, p' denotes a position of another pixel for noise reduction within the filter, α denotes a factor for adjusting a noise level, for example, intensity variance of a pixel value, $\sigma_r$ denotes a noise level variable, and $\sigma_d$ denotes a distance level variable between pixels.

$\hat{D}_{intensity}(p')$ expressing the intensity difference between pixels may be expressed by Equation 5.

$$\hat{D}_{intensity}(p') = (1 + \gamma_1 \gamma_2 (\frac{th_{Ref}}{th_R} - 1))(I(p') - I(p))$$ [Equation 5]

$$\gamma_1 = \frac{1}{1 + e^{-\alpha_1(|D_{intensity\_R}| - th_R)}}$$

$$\gamma_2 = \frac{e^{-\alpha_2(|D_{intensity\_Ref}| - th_{Ref})}}{1 + e^{-\alpha_2(|D_{intensity\_Ref}| - th_{Ref})}}$$

In Equation 5, p' denotes a position of another pixel for noise reduction within the filter, $th_{Ref}$ denotes a threshold of the reference image 420, and $th_R$ denotes a threshold of the red channel 410.

Figure 5A:
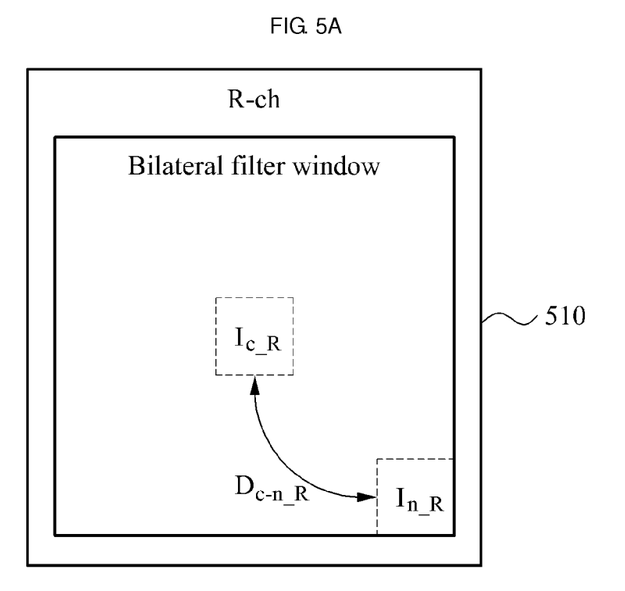
FIGS. 5A and 5B illustrate an example of applying a bilateral filter to a red channel using chrominance of a reference image according to an embodiment.
Figure 5B:
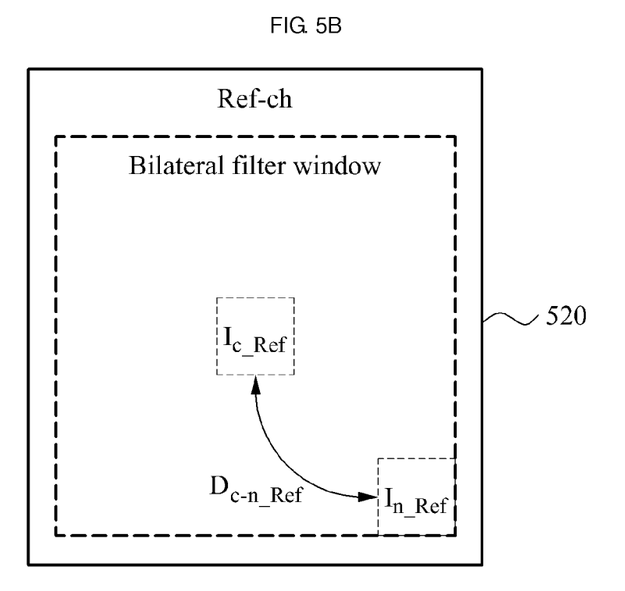

An example in which a corrected bilateral filter is applied to a red channel may be verified from FIG. 5.

FIGS. 5A and 5B illustrate an example of applying a bilateral filter to a red channel using chrominance of a reference image according to an embodiment.

To perform bilateral filtering with respect to the red channel, a noise reduction apparatus according to an embodiment may calculate a pixel value difference within a window 510 having a size of 2N×2N and a distance difference between pixels, as illustrated in FIG. 5A.

The noise reduction apparatus may determine whether I(p) or I(p') of the red channel is noise by employing γ1 or γ2 as a weight.

When p) or I(p') of the red channel is noise, a pixel value difference between two pixels may be great, whereas a pixel value difference at the same position in a reference image may be small or barely exist.

Using the above characteristic, the noise reduction apparatus may calculate the weight γ1 based on a pixel value difference of the red channel and calculate the weight γ2 based on a pixel value difference of the reference image 420.

In the case of applying the above two weights γ1 and γ2 to the bilateral filter, the difference, for example, the intensity difference between pixel values of the bilateral filter may be generated as expressed by Equation 4. Therefore, in the case in which details and noise are not distinguishable from each other due to a significantly great noise value during filtering, noise reduction may be effectively performed.

In the case of configuring Equation 4 in an actual system, it may be configured as expressed by Equation 6, in order to decrease an amount of calculation of an exponential function.

when [Equation 6]

$$((|D_{intensity\_R}| > th_R)$$

and $$(|D_{intensity\_Ref}| < th_{Ref})$$

$$D_{intensity\_R} = D_{intensity\_R} \times \frac{th_{Ref}}{th_R}$$

$$\sigma = skellam\left(\sum I_R\right)$$

In Equation 6, a first condition $|D_{intensity\_R}| > th_R$ is a condition capable of determining that at least one of two pixels calculated in a filter window of the red channel becomes a high sensitivity noise or edge area, when a pixel value difference between a center pixel and an in-window pixel is greater than a predetermined threshold, in the case of performing bilateral filtering.

A second condition $|D_{intensity\_R}| > th_{Ref}$ is a condition capable of determining that a corresponding pixel is not an edge are and thus is noise when a pixel value difference between a pixel corresponding to the center pixel and a pixel corresponding to the in-window pixel in a reference image 520 is less than the predetermined threshold, as illustrated in FIG. 5B.

The noise reduction apparatus may effectively reduce addictive white Gaussian noise (AWGN) and impulse noise in a high sensitivity image, for example, a high ISO image, and may also prevent color noise or degradation in details that may occur in a high chroma area.

Specifically, the noise reduction apparatus may be used to create a high quality color image from a color filter array Bayer pattern image.

In an image signal processor, a noise reduction module may be required and may greatly affect performance. Therefore, enhancing performance of the noise reduction module may become an issue to evaluate performance of a digital image input apparatus.

When designing the noise reduction module inside the image signal processor using the noise reduction apparatus, it is possible to effectively reduce color noise.

In addition, even in the high sensitivity image or the high ISO image in which quality degradation becomes serious due to noise, it is possible to reduce AWGN and impulse noise, and to prevent color noise or degradation in details that may occur in a high chroma area.

Accordingly, noise reduction may be effectively performed with respect to a digital image captured in a low luminance environment in which an amount of light is insufficient. Therefore, a high quality image may be obtained. When applying the high quality image to the image signal process of the camera or applying a digital image application device equipped with the image signal processor, relevant product functionality may be further enhanced.

Figure 6:
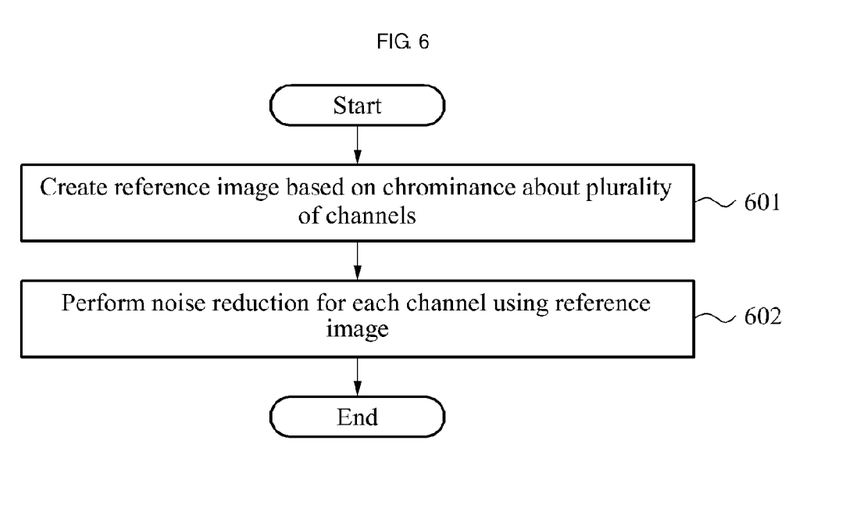
FIG. 6 illustrates a noise reduction method according to an embodiment.

FIG. 6 illustrates a noise reduction method according to an embodiment.

Referring to FIG. 6, in operation 601, a reference image may be created based on chrominance about a plurality of channels included in an output image obtained from an image sensor of a camera.

The plurality of channels may include at least one of a green channel, a red channel, and a blue channel.

For example, the noise reduction method may generate a pixel value of a pixel position corresponding to a first channel by applying chrominance of the first channel among the plurality of channels, and by interpolating a second channel and a third channel based on the chrominance of the first channel, and may create the reference image using the generated pixel value of the pixel position. More specifically, in an embodiment, the noise reduction method may generate a pixel value of a pixel position corresponding to a green channel by applying chrominance of the green channel, among the plurality of channels, and by interpolating the red channel and the blue channel based on the chrominance of the green channel. The noise reduction method may then create the reference image using the generated pixel value of the pixel position.

Specifically, instead of generating a chrominance channel to perform noise reduction in which color noise is considered in a Bayer pattern image domain, the noise reduction method may create the reference image using the chrominance.

When creating the reference image, the noise reduction method may perform weighted averaging of the red channel and the blue channel in an area that a green channel may not express, while maximally using details and small noise of the noise reduced green channel.

The noise reduction method may perform multi-resolution noise reduction by performing bilateral filtering for each pyramid level of the green channel using a Laplacian pyramid, and may create the reference image using the noise reduced green channel.

In operation 602, noise reduction may be performed for each channel using the created reference image.

When performing noise reduction with respect to the red channel or the blue channel, the noise reduction method may determine whether a corresponding pixel of an image in the red channel or the blue channel is noise, based on a pixel value difference at the same position in the reference image during a filtering process.

Figure 7:
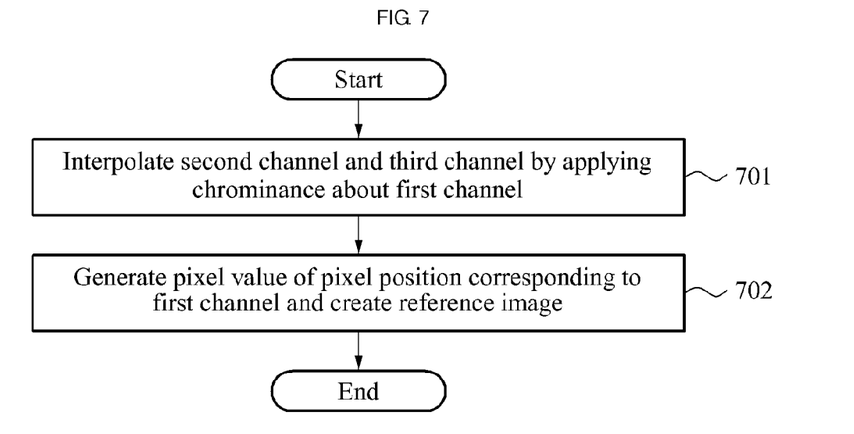
FIG. 7 illustrates an operation of creating a reference in detail in the noise reduction method of FIG. 6.

FIG. 7 illustrates an operation of creating a reference image in detail in the noise reduction method of FIG. 6.

Referring to FIG. 7, in operation 701, the second channel and the third channel may be interpolated by applying chrominance about the first channel among the plurality of channels.

In operation 702, the reference image may be created by generating a pixel value of a pixel position corresponding to the first channel.

Figure 8:
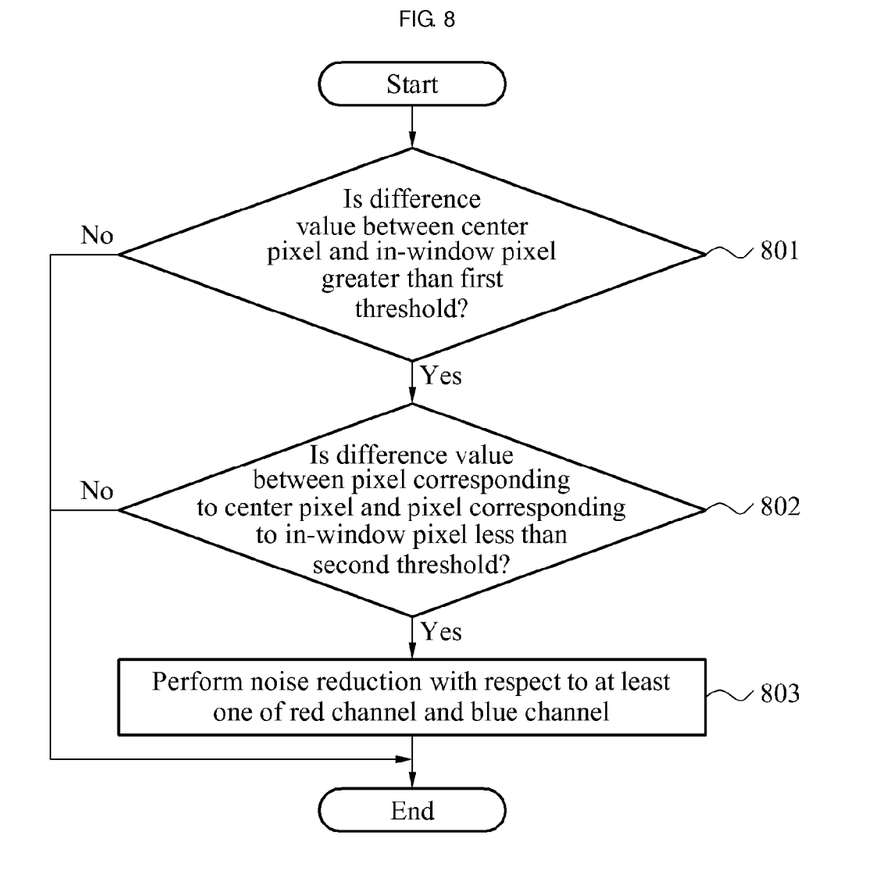
FIG. 8 illustrates an operation of determining a noise reduction condition in the noise reduction method of FIG. 6.

FIG. 8 illustrates an operation of determining a noise reduction condition in the noise reduction method of FIG. 6.

Referring to FIG. 8, in the case of performing bilateral filtering with respect to at least one of the red channel and the blue channel included in the output image to perform the noise reduction, whether a difference value between a center pixel and an in-window pixel is greater than a first threshold may be determined in operation 801.

When the difference value between the center pixel and the in-window pixel is greater than the first threshold, whether a difference value between a pixel corresponding to the center pixel and a pixel corresponding to the in-window pixel in the reference image is less than a second threshold may be determined in operation 802.

When the difference value between the pixel corresponding to the center pixel and the pixel corresponding to the in-window pixel in the reference image is less than the second threshold, the noise reduction method may perform noise reduction with respect to at least one of the red channel and the blue channel in operation 803.

When the difference value between the center pixel and the in-window pixel is less than the first threshold, or when the difference value between the pixel corresponding to the center pixel and the pixel corresponding to the in-window pixel in the reference image is greater than the second threshold, the noise reduction method may determine that the corresponding pixel is barely affected by noise, and may not perform noise reduction.

The noise reduction method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a controller such as a dedicated processor unique to that unit or by a processor common to one or more of the modules. The described methods may be executed on a general purpose computer or processor or may be executed on a particular machine such as the noise reduction apparatuses described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A noise reduction apparatus of an image signal processor, the apparatus comprising:
    a processor to control one or more processor-executable units;
    a reference image creator unit to create a reference image based on chrominance about a plurality of channels included in an output image obtained from an image sensor of a camera; and
    a noise reduction unit to perform noise reduction for each channel of the plurality of channels using the created reference image,
    wherein the plurality of channels comprises at least one of a green channel, a red channel, and a blue channel,
    wherein the reference image creator unit performs noise reduction with respect to the green channel, and creates the reference image using the noise-reduced green channel, the red channel, and the blue channel,
    wherein the noise reduction apparatus further comprises performing bilateral filtering with respect to at least one of the red channel and the blue channel included in the output image,
    wherein, in the bilateral filtering, when a difference value between a center pixel and an in-window pixel is greater than a first threshold, and when a difference value between a pixel corresponding to the center pixel and a pixel corresponding to the in-window pixel in the reference image is less than a second threshold, the noise reduction unit performs the noise reduction with respect to at least one of the red channel and the blue channel.

2. The apparatus of claim 1, wherein the reference image creator unit performs multi-resolution noise reduction by performing bilateral filtering for respective pyramid levels of the green channel using a Laplacian pyramid, and creates the reference image using the noise reduced green channel.

3. The apparatus of claim 1, wherein the reference image creator unit generates a pixel value of a red pixel position corresponding to the red channel by applying chrominance of the red pixel position corresponding to the red channel and by interpolating the green channel and the blue channel, and creates the reference image using the generated pixel value of the red pixel position.

4. The apparatus of claim 1, wherein the reference image creator unit generates a pixel value of a blue pixel position corresponding to the blue channel by applying chrominance of the blue pixel position corresponding to the blue channel and by interpolating the green channel and the red channel, and creates the reference image using the generated pixel value of the blue pixel position.

5. The apparatus of claim 1, wherein the noise reduction unit distinguishes the green channel, the red channel, and the blue channel, and performs the noise reduction individually with respect to the green channel, the red channel, and the blue channel.

6. The apparatus of claim 1, wherein the noise reduction unit performs the noise reduction for the respective channels by applying the created reference image to the red channel and the blue channel.

7. A noise reduction method of an image signal processor, the method comprising:
generating, by way of a processor, a pixel value of a pixel position corresponding to a first channel by applying chrominance about the first channel among a plurality of channels included in an output image obtained from an image sensor of a camera and by interpolating a second channel and a third channel, and creating a reference image using the generated pixel value of the pixel position; and
performing noise reduction for each channel of the plurality of channels using the created reference image,
wherein the plurality of channels comprises at least one of a green channel, a red channel, and a blue channel,
wherein the creating the reference image comprises performing noise reduction with respect to the green channel, and creating the reference image using the noise-reduced green channel, the red channel, and the blue channel; and
performing bilateral filtering with respect to at least one of the red channel and the blue channel included in the output image,
wherein, in the bilateral filtering, when a difference value between a center pixel and an in-window pixel is greater than a first threshold, and when a difference value between a pixel corresponding to the center pixel and a pixel corresponding to the in-window pixel in the reference image is less than a second threshold, the performing of the noise reduction is performed with respect to at least one of the red channel and the blue channel.

8. The method of claim 7, wherein the creating further comprises performing multi-resolution noise reduction by performing bilateral filtering for respective pyramid levels of the green channel using a Laplacian pyramid, and creating the reference image using the noise reduced green channel.

9. The method of claim 7, wherein the performing comprises distinguishing the green channel, the red channel, and the blue channel, and performing noise reduction individually with respect to the green channel, the red channel, and the blue channel.

10. The method of claim 7, wherein the performing comprises performing noise reduction for the respective channels by applying the created reference image to the red channel and the blue channel.

11. A non-transitory computer-readable medium comprising a program for instructing a computer to perform the method of claim 7.

12. The method of claim 7, wherein the output image obtained from the image sensor of the camera comprises a bayer pattern image.

13. The method of claim 7, wherein the noise reduction method creates the reference image using the generated pixel value of the pixel position instead of generating a chrominance channel to perform the noise reduction.

14. A noise reduction method of an image signal processor, the method comprising:
creating, by way of a processor, a reference image by generating a pixel value of a pixel position corresponding to a first channel, of a plurality of channels included in an output image obtained from an image sensor of a camera, by applying chrominance of the first channel and by interpolating at least one other channel of the plurality of channels; and
performing noise reduction for each of the plurality of channels using the created reference image,
wherein the plurality of channels comprises at least one of a green channel, a red channel, and a blue channel,
wherein the creating, by way of the processor, of the reference image comprises performing noise reduction with respect to the green channel, and creating the reference image using the noise-reduced green channel, the red channel, and the blue channel; and
performing bilateral filtering with respect to at least one of the red channel and the blue channel included in the output image,
wherein, in the bilateral filtering, when a difference value between a center pixel and an in-window pixel is greater than a first threshold, and when a difference value between a pixel corresponding to the center pixel and a pixel corresponding to the in-window pixel in the reference image is less than a second threshold, the performing of the noise reduction is performed with respect to at least one of the red channel and the blue channel.

15. A non-transitory computer-readable medium comprising a program for instructing a computer to perform the method of claim 14.

* * * * *